United States Patent
Taguchi

(10) Patent No.: US 7,719,653 B2
(45) Date of Patent: May 18, 2010

(54) SUBSTRATE FOR A LIQUID CRYSTAL DISPLAY DEVICE AND LIQUID CRYSTAL DISPLAY DEVICE

(75) Inventor: Yoshihisa Taguchi, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/342,328

(22) Filed: Dec. 23, 2008

(65) Prior Publication Data

US 2009/0147166 A1 Jun. 11, 2009

Related U.S. Application Data

(63) Continuation of application No. 11/333,144, filed on Jan. 17, 2006, now Pat. No. 7,586,574.

(30) Foreign Application Priority Data

Jan. 19, 2005 (JP) ............................. 2005-011332

(51) Int. Cl.
G02F 1/1343 (2006.01)
(52) U.S. Cl. ....................................... 349/144; 349/39
(58) Field of Classification Search .................. 349/39, 349/144
See application file for complete search history.

(56) References Cited

U.S. PATENT DOCUMENTS

| | | | |
|---|---|---|---|
| 7,206,048 B2* | 4/2007 | Song | 349/129 |
| 7,221,413 B2* | 5/2007 | Lai | 349/38 |
| 2005/0078253 A1* | 4/2005 | Kim et al. | 349/139 |
| 2006/0103800 A1 | 5/2006 | Li et al. | |

OTHER PUBLICATIONS

Taguchi; "Substrate for a Liquid Crystal Display Device and Liquid Crystal Display Device"; U.S. appl. No. 11/333,144, filed Jan. 17, 2006.

* cited by examiner

Primary Examiner—Michael H Caley
(74) Attorney, Agent, or Firm—Keating & Bennett, LLP

(57) ABSTRACT

The present invention relates to a substrate for a liquid crystal display device and a liquid crystal display device which are used as, for example, a display unit of an electronic apparatus, and an object of the present invention is therefore to provide a substrate for a liquid crystal display device and a liquid crystal display device capable of providing high transmittance, high luminance, and good display characteristics as well as a high production yield. A substrate for a liquid crystal display device is provided with a storage capacitor bus line formed approximately parallel with a gate bus line, a first pixel electrode connected electrically to the source electrode of a transistor, a second pixel electrode formed so as to be opposed to part of the source electrode of the transistor via an insulating film and to be separate from the first pixel electrode, and a slit formed between the adjoining end portions of the first pixel electrode and the second pixel electrode and having a slit width which is greater than a shortest width in a region over the storage capacitor bus line.

5 Claims, 3 Drawing Sheets

SUBSTRATE FOR A LIQUID CRYSTAL DISPLAY DEVICE AND LIQUID CRYSTAL DISPLAY DEVICE

BACKGROUND OF THE INVENTION

1. Field of the Invention

The present invention relates to a substrate for a liquid crystal display device and a liquid crystal display device which are used as, for example, a display unit of an electronic apparatus.

2. Description of the Related Art

In recent years, liquid crystal display devices have come to be used for TV receivers, monitor devices of personal computers, etc. In these purposes, liquid crystal display devices are required to have a superior viewing angle characteristic that allows the display screen to produce high-quality images even when viewed from all directions. MVA (multi-domain vertical alignment)-type liquid crystal display devices are known as ones capable of providing a superior viewing angle characteristic. In MVA-type liquid crystal display devices, the liquid crystal molecules are aligned perpendicularly to the substrates when no voltages are applied. When voltages are applied to the liquid crystal, the alignment of the liquid crystal molecules is determined by projections formed on the counter substrate or slits formed in a transparent electrode (ITO electrode).

In general, in vertical-alignment-type liquid crystal display devices such as MVA-type ones in which the liquid crystal molecules are aligned perpendicularly to the substrates, a transmittance vs application voltage characteristic (T-V characteristic) obtained when the display screen is viewed from the direction perpendicular to it (i.e., front direction) is different from that obtained when the display screen is viewed from an oblique direction. Because of this phenomenon, even if the T-V characteristic obtained when the display screen is viewed from the direction perpendicular to it is optimized, the color of an image looks whitish due to a distorted T-V characteristic when the display screen is viewed from an oblique direction. A pixel structure for solving this problem is known in which each pixel is divided into two sub-pixels A and B. A pixel electrode α of the sub-pixel A is electrically connected to the source electrode of a thin-film transistor (TFT) for pixel driving and a pixel electrode β of the sub-pixel B is insulated from the source electrode of the TFT and rendered in a floating state.

In this pixel structure, a control capacitance Cc is formed by the pixel electrode β of the sub-pixel B, the source electrode of the TFT, and an insulating film interposed between these two electrodes. Because of capacitive coupling via the control capacitance Cc, a lower voltage is applied to the pixel electrode β of the sub-pixel B than the pixel electrode α of the sub-pixel A. As a result, regions having different T-V characteristics are formed in the two regions of each pixel so as to lower the degree of distortion of T-V characteristics obtained when the display screen is viewed from oblique directions, whereby the phenomenon that an image looks whitish when viewed from an oblique direction can be suppressed and the viewing angle characteristic can be improved.

The above technique is disclosed in JP-A-2-12, U.S. Pat. No. 4,840,460, and Japanese Patent No. 3,076,938.

Incidentally, a slit that is formed between the adjoining end portions of the pixel electrodes α and β and serves to separate the sub-pixels A and B is usually as small as several micrometers in width. Therefore, if a patterning failure occurs in forming the pixel electrodes α and β, a pixel electrode forming material may remain in the slit to short-circuit the pixel electrodes α and β. This is a factor of lowering the production yield of the liquid crystal display device. Further, if the pixel electrodes α and β are short-circuited, the same voltage is applied to the sub-pixels A and B and hence the effect of lowering the degree of distortion of oblique-direction T-V characteristics is lost, resulting in a problem that it becomes difficult to obtain good display characteristics.

SUMMARY OF THE INVENTION

An object of the present invention is therefore to provide a substrate for a liquid crystal display device and a liquid-crystal display device capable of providing high transmittance, high luminance, and good display characteristics as well as a high production yield.

The above object is attained by a substrate for a liquid crystal display device comprising a gate bus line formed on an insulating substrate; a drain bus line formed so as to cross the gate bus line with an insulating film interposed in between; a storage capacitor bus line formed approximately parallel with the gate bus line; a transistor having a gate electrode connected electrically to the gate bus line, a drain electrode connected electrically to the drain bus line, and a source electrode; a first pixel electrode connected electrically to the source electrode of the transistor; a second pixel electrode formed so as to be opposed to part of the source electrode of the transistor via an insulating film and to be separate from the first pixel electrode; and a slit formed between adjoining end portions of the first pixel electrode and the second pixel electrode and having a slit width which is greater than a shortest width in a region over the storage capacitor bus line.

The invention can realize a liquid crystal display device capable of providing high transmittance, high luminance, and good display characteristics as well as a high production yield.

DESCRIPTION OF THE PREFERRED EMBODIMENT

A substrate for a liquid crystal display device and a liquid crystal display device according to an embodiment of the present invention will be hereinafter described with reference to FIGS. 1 to 4.

Figure 1:
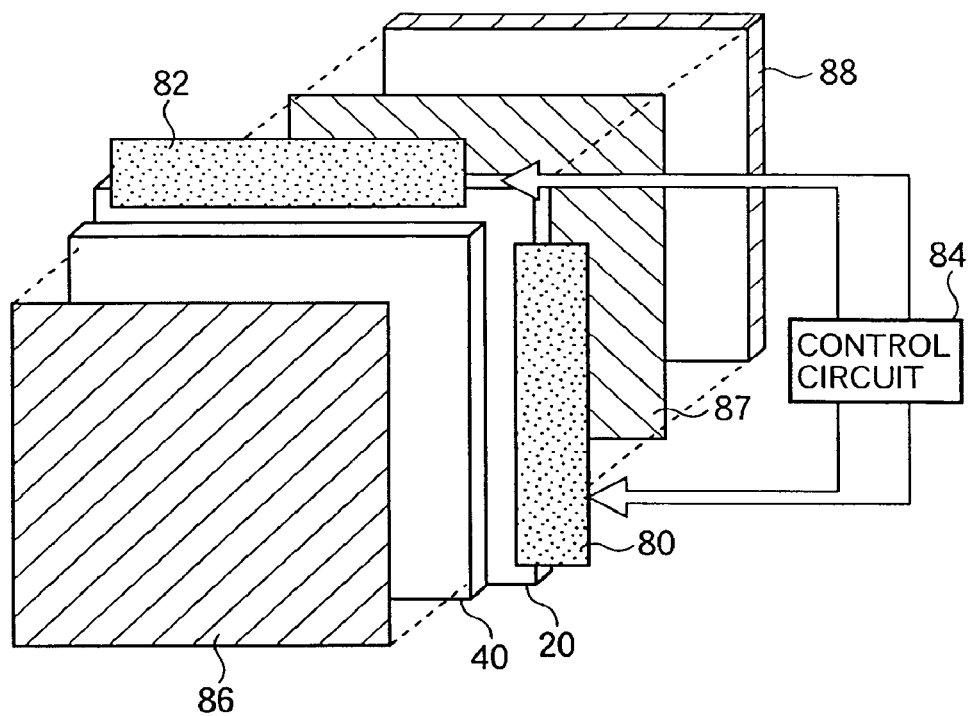
FIG. 1 schematically shows the configuration of a liquid crystal display device according to an embodiment of the present invention.
Figure 2:
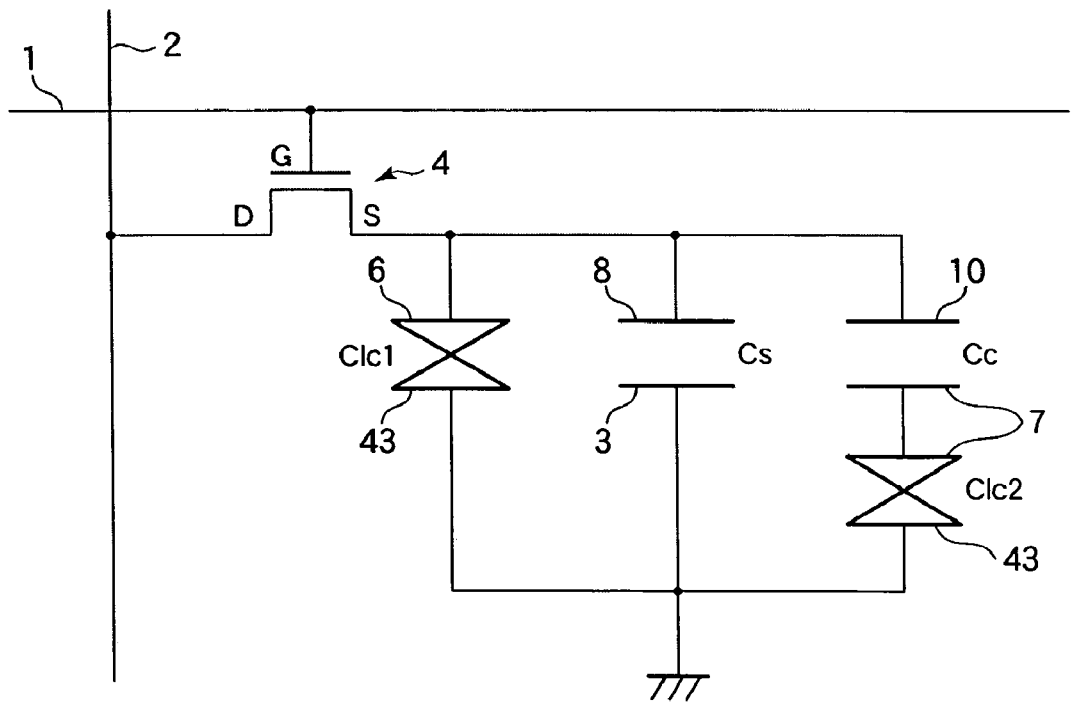
FIG. 2 is an equivalent circuit diagram showing a one-pixel configuration of the liquid crystal display device according to the embodiment of the invention.

FIG. 1 schematically shows the configuration of the liquid crystal display device according to the embodiment. FIG. 2 is an equivalent circuit diagram showing a one-pixel configuration of the liquid crystal display device according to the embodiment. As shown in FIGS. 1 and 2, the liquid crystal display device has a TFT substrate 20 which is provided with gate bus lines 1 and drain bus lines (data bus lines) 2 which cross each other with an insulating film interposed in between, TFTs 4 which are formed for the respective pixels, and first and the second pixel electrodes 6 and 7. The liquid crystal display device is also equipped with a counter substrate 40 which is opposed to the TFT substrate 20 with a predetermined cell gap. A liquid crystal having negative dielectric anisotropy, for example, is sealed between the TFT substrate 20 and the counter substrate 40. Color filters (CFs) and a common electrode 43 are formed on the liquid-crystal-side surface of the counter substrate 40.

A gate bus line driving circuit 80 incorporating a driver IC for driving the plural gate bus lines 1 and a drain bus line driving circuit 82 incorporating a driver IC for driving the plural drain bus lines 2 are connected to the TFT substrate 20. The driving circuits 80 and 82 output scanning signals and gradation signals to predetermined gate bus lines 1 and plural drain bus lines 2 on the basis of control signals that are output from a control circuit 84. A polarizing plate 87 is disposed on that surface of the TFT substrate 20 which is opposite to its liquid-crystal-side surface and a polarizing plate 86 is disposed on that surface of the counter substrate 4 which is opposite to its liquid-crystal-side surface, the polarizing plates 86 and 87 being in a crossed-Nicols arrangement. A backlight unit 88 is disposed on that surface of the polarizing plate 87 which is opposite to the TFT substrate 20.

As shown in FIG. 2, the gate electrode G of the TFT 4 is electrically connected to the gate bus line 1 and its drain electrode D is connected to the drain bus line 2. The source electrode S of the TFT 4 is electrically connected to the first pixel electrode 6, a storage capacitor electrode 8, and a connection electrode 10. A first liquid crystal capacitance Clc1 is formed by the first pixel electrode 6, the common electrode 43 which is provided on the counter substrate 40 side and opposed to the first pixel electrode 6, and that part of the liquid crystal which is interposed between the first pixel electrode 6 and the common electrode 43. A storage capacitor Cs is formed by the storage capacitor electrode 8, a storage capacitor bus line 3 which is opposed to the storage capacitor electrode 8, and that part of an insulating film which is interposed between the storage capacitor electrode 8 and the storage capacitor bus line 3. A control capacitance Cc is formed by the connection electrode 10, the second pixel electrode 7 which is opposed to the connection electrode 10, and that part of an insulating film which is interposed between the connection electrode 10 and the second pixel electrode 7. A second liquid crystal capacitance Clc2 is formed by the second pixel electrode 7, the common electrode 43 which is provided on the counter substrate 40 side and opposed to the second pixel electrode 7, and that part of the liquid crystal which is interposed between the second pixel electrode 7 and the common electrode 43. In the embodiment, the same potential is applied to the storage capacitor bus line 3 and the common electrode 43.

As described above, the circuit configuration of each pixel according to the embodiment is such that the second liquid crystal capacitance Clc2 and the control capacitance Cc are connected to each other in series and each of the first liquid crystal capacitance Clc1 and the storage capacitor Cs is connected to the above series connection in parallel. When the TFT 4 has been turned on, a pixel signal supplied to the drain bus line 2 is applied to the first pixel electrode 6, the storage capacitor electrode 8, and the connection electrode 10. On the other hand, a common potential is applied to the storage capacitor bus line 3 and the common electrode 43. As a result, a potential that is lower than the potential of the gradation signal applied to the first pixel electrode 6 by a predetermined value is applied to the second pixel electrode 7.

Figure 3:
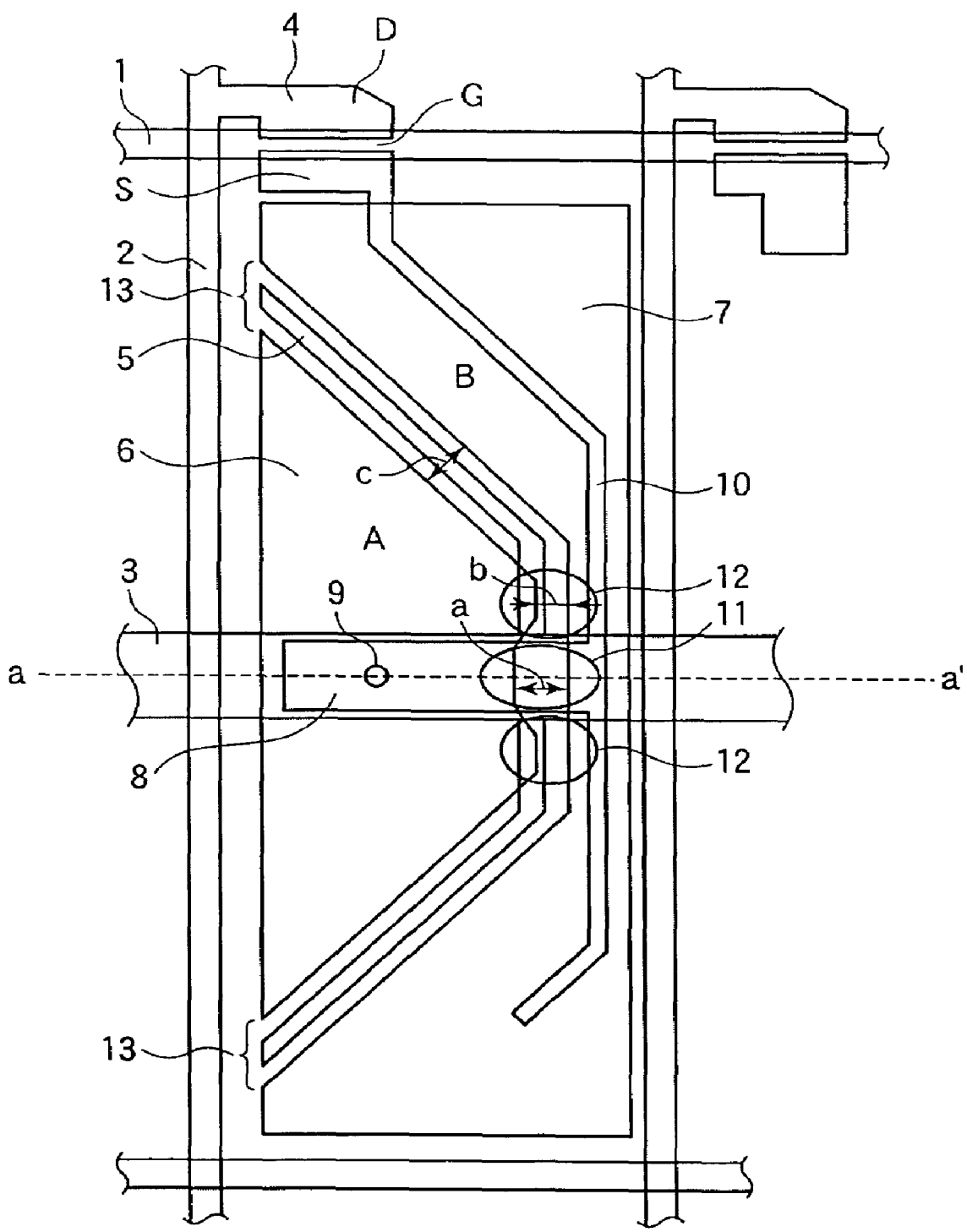
FIG. 3 is a plan view showing a one-pixel configuration of a substrate for a liquid crystal display device according to the embodiment of the invention.
Figure 4:
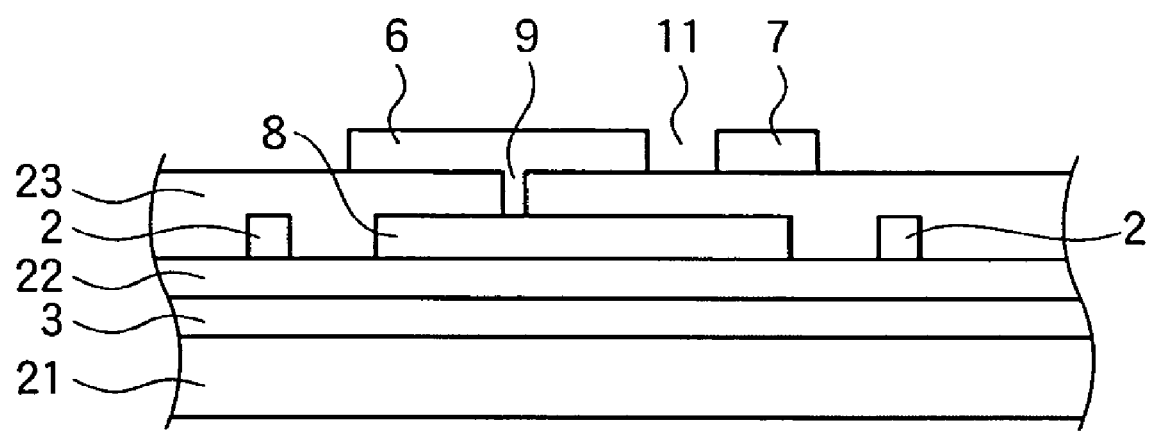
FIG. 4 is a sectional view showing the one-pixel configuration of the substrate for a liquid crystal display device according to the embodiment of the invention.

FIG. 3 is a plan view showing a one-pixel configuration of the TFT substrate 20 as a substrate for a liquid crystal display device according to the embodiment. FIG. 4 is a sectional view taken along line a-a' in FIG. 3 showing the configuration of the TFT substrate 20. As shown in FIGS. 3 and 4, the TFT substrate 20 has the gate bus line 1 which is formed on a glass substrate (insulating substrate) 21 and the drain bus line 2 which is formed so as to cross the gate bus line 1 with an insulating film 22 such as an SiN film interposed in between. The TFT 4 as a switching element is disposed close to the crossing point of the gate bus line 1 and the drain bus line 2. Part of the gate bus line 1 functions as the gate electrode G of the TFT 4. An operational semiconductor layer of the TFT 4 is formed on the gate bus line 1 via the insulating film (gate insulating film) 22, and the drain electrode D and the source electrode S are formed on the operational semiconductor layer so as to be opposed to each other with a predetermined gap. A final protective film 23 such as an SiN film is formed above the drain electrode D and the source electrode S over the entire substrate surface.

The storage capacitor bus line 3 is formed so as to traverse a pixel region defined by the gate bus lines 1 and the drain bus lines 2 and to extend parallel with the gate bus lines 1. The storage capacitor electrode 8, which is provided for each pixel, is formed above the storage capacitor bus line 3 with the insulating film 22 interposed in between. The storage capacitor electrode 8 is electrically connected to the source electrode S of the TFT 4 via the connection electrode 10. The storage capacitor Cs is formed by the storage capacitor bus line 3 and the storage capacitor electrode 8 which are opposed to each other via the insulating film 22 and the insulating film 22.

The pixel region, which is defined by the gate bus lines 1 and the drain bus lines 2, is divided into a first sub-pixel A and a second sub-pixel B. As shown in FIG. 3, the first sub-pixel A which has a trapezoidal shape, for example, is disposed at the center (in the vertical direction as viewed in FIG. 3) close to the left-hand end line of the pixel region. And the second sub-pixel B occupies those portions of the pixel region which exclude the first sub-pixel A, that is, a top portion, a bottom portion, and a portion that is located at the center (in the vertical direction as viewed in FIG. 3) close to the right-hand end line of the pixel region. For example, in the pixel region, each of the first sub-pixel A and the second sub-pixel B is formed so as to be approximately line-symmetrical with respect to the storage capacitor bus line 3. The first pixel electrode 6 is formed in the first sub-pixel A and the second pixel electrode 7 is formed in the second sub-pixel B. Each of the first pixel electrode 6 and the second pixel electrode 7 is a transparent conductive film such as an ITO film.

A slit 13 is formed between the adjoining end portions of the first pixel electrode 6 and the second pixel electrode 7 as an ITO-film-omitted portion. Since the first pixel electrode 6 and the second pixel electrode 7 are shaped as described above, the slit 13 is shaped so as to extend approximately perpendicularly to the storage capacitor bus line 3 from the right side of the pixel and then extend obliquely upward and downward toward the left side of the pixel.

The width of the slit 13, which is formed between the adjoining end portions of the first pixel electrode 6 and the second pixel electrode 7, varies depending on the position. The oblique portions of the slit 13 function not only as separation slits for separating the first pixel electrode 6 and the second pixel electrode 7 from each other but also as alignment control structures for controlling the alignment direction of the liquid crystal. If the width of the slit 13 is too great, the electrode areas of the first pixel electrode 6 and the second pixel electrode 7 are reduced, as a result of which the transmittance and hence the luminance is lowered. In view of these conditions, the width c of those portions of the slit 13 which extend upward and downward toward the left side of the pixel is set at about 10 μm.

On the other hand, as indicated by an imaginary ellipse 12, those portions of the slit 13 which extend approximately perpendicularly to the storage capacitor bus line 3 from the right side of the pixel do not contribute to the alignment control of the liquid crystal and exist only for separating the first pixel electrode 6 and the second pixel electrode 7 from each other. Therefore, the width of these portions of the slit 13 may be set at a minimum width b taking into consideration a patterning margin of the current photolithography technology for liquid crystal display devices; in the embodiment, the minimum width b is set at 7 μm. This can lower the probability that the first pixel electrode 6 and the second pixel electrode 7 are connected to each other when they are formed.

As indicated by an imaginary ellipse 11, the portion over the storage capacitor bus line 3 is shielded from light coming from the backlight unit 88 and hence does not contribute to the transmittance. Therefore, to further lower, in a reliable manner, the probability that the first pixel electrode 6 and the second pixel electrode 7 are connected to each other when they are formed, the width a of the portion, over the storage capacitor bus line 3, the slit 13 is set greater than the minimum width b. In the embodiment, the width a of the portion over the storage capacitor bus line 3 is set at about 10 μm, which is the same as the width c. However, the width a is only required to be greater than the minimum width b and may be either greater than or shorter than the width c. With these measures, the rate of occurrence of short-circuiting of the first pixel electrode 6 and the second pixel electrode 7 during their formation can be reduced without lowering the transmittance of the liquid crystal display device.

Incidentally, the first pixel electrode 6 is connected to the storage capacitor electrode 8 via a contact hole 9 which is formed through the final protective film 23. The storage capacitor electrode 8 is electrically connected to the source electrode S of the TFT 4 via the connection electrode 10. By this, the first pixel electrode 6 is connected directly to the source electrode S of the TFT 4, and a gradation signal on the drain bus line 2 is supplied to the first pixel electrode 6 when the TFT 4 is in an on-state. When viewed perpendicularly to the substrate surface, a portion of the second pixel electrode 7 overlaps with portions of the connection electrode 10 and the storage capacitor electrode 8 with the final protective film 23 interposed in between. Those portions of the connection electrode 10 and the storage capacitor electrode 8 which overlap with the portion of the second pixel electrode 7 function as a control capacitance electrode, and the control capacitance (second storage capacitor) Cc is formed by the control capacitance electrode, the second pixel electrode 7, and that part of the final protective film 23 which is interposed in between. In this manner, the second pixel electrode 7 is connected indirectly to the source electrode S of the TFT 4 via the control capacitance Cc (capacitive coupling).

The counter electrode 40 has a CF resin layer (not shown) formed on the glass substrate and the common electrode 43 formed on the CF resin layer. The liquid crystal capacitance Clc1 is formed between the first pixel electrode 6 of the first sub-pixel A and the common electrode 43 which are opposed to each other via the liquid crystal. The liquid crystal capacitance Clc2 is formed between the second pixel electrode 7 of the second sub-pixel B and the common electrode 43. A vertical alignment film (not shown) in formed at the boundary between the TFT substrate 20 and the liquid crystal and another vertical alignment film (not shown) in formed at the boundary between the counter substrate 40 and the liquid crystal, whereby the liquid crystal molecules are aligned approximately perpendicularly to the substrate surfaces when no voltages are applied.

When the TFT 4 is turned on and a gradation signal is supplied, the potential of the gradation signal is applied to the first pixel electrode 6 and a predetermined potential that is lower than the potential of the gradation signal is applied to the second pixel electrode 7 from the connection electrode 10 via the final protective film 23. As a result, two regions having different T-V characteristics are formed in each pixel so as to lower the degree of distortion of oblique-direction T-V characteristics, whereby the phenomenon that the color of an image looks whitish when viewed from an oblique direction can be suppressed and the viewing angle characteristic can thereby be improved.

In the embodiment, the width of the slit 13 is 7 μm at the minimum and the widths of those portions of the slit 13 which do not contribute to the display characteristics are greater than 7 μm. This prevents the phenomenon that a pixel electrode material remains in the slit 13 during patterning of the first pixel electrode 6 and the second pixel electrode 7 and the pixel electrodes 6 and 7 are short-circuited. The production yield of the liquid crystal display device can thereby be increased. Since the short-circuiting of the first pixel electrode 6 and the second pixel electrode 7 can be prevented reliably, good display characteristics can be obtained in which the degree of distortion of oblique-direction T-V characteristics is lowered.

As shown in FIG. 3, storage capacitor lead lines 5 are formed so as to lead from the storage capacitor bus line 3 and to extend approximately along the center line of the slit 13. The storage capacitor lead lines 5 flatten electric fields that develop around the slit 13 when voltages are applied to the liquid crystal, which prevents singular points of alignment vectors of the liquid crystal from occurring in the slit 13.

Further, as shown in FIG. 3, the storage capacitor lead lines 5 overlap with the first pixel electrode 6 when viewed perpendicularly to the substrate surface. This makes it possible to increase the aperture ratio of the sub-pixel A while increasing the area of the electrode for forming the storage capacitor Cs.

The invention is not limited to the above embodiment and various modifications are possible.

For example, although the embodiment is directed to the VA-mode (MVA-type) liquid crystal display device, the invention is not limited to such a case and can also be applied to other types of liquid crystal display devices such as TN-mode ones.

Although the embodiment is directed to the transmission-type liquid crystal display device, the invention is not limited to such a case and can also be applied to reflection-type and transflective-type liquid crystal display devices.

Although the embodiment is directed to the liquid crystal display device in which the CFs are formed on the counter substrate which is opposed to the TFT substrate, the invention is not limited to such a case and can also be applied to liquid crystal display devices having what is called a CF-on-TFT structure in which CFs are formed on the TFT substrate.

What is claimed is:

1. A substrate for a liquid crystal display device, comprising:
    a gate bus line arranged on an insulating substrate;
    a drain bus line arranged to cross the gate bus line with an insulating film interposed in between;
    a storage capacitor bus line arranged to be approximately parallel with the gate bus line;

a transistor including a gate electrode connected electrically to the gate bus line, a drain electrode connected electrically to the drain bus line, and a source electrode;

a first pixel electrode connected electrically to the source electrode of the transistor;

a second pixel electrode arranged to be opposed to part of the source electrode of the transistor via an insulating film and to be separate from the first pixel electrode; and a slit arranged between adjoining end portions of the first pixel electrode and the second pixel electrode and including a first portion extending approximately perpendicularly to the storage capacitor bus line and a second portion extending obliquely to the storage capacitor bus line; wherein a width of the second portion of the slit is greater than a shortest width of the first portion of the slit.

2. The substrate for a liquid crystal display device according to claim 1, further comprising a storage capacitor lead line which leads from the storage capacitor bus line and extends along the slit.

3. The substrate for a liquid crystal display device according to claim 2, wherein at least part of the storage capacitor lead line overlaps with part of the first pixel electrode when viewed perpendicularly to a surface of the insulating substrate.

4. The substrate for a liquid crystal display device according to claim 1, wherein the shortest width is 7 μm or more.

5. A liquid crystal display device comprising:

a pair of substrates opposed to each other; and a liquid crystal sealed between the pair of substrates, wherein the substrate for a liquid crystal display device according to claim 1 is used as one of the pair of substrates.

* * * * *